US011429153B2

(12) United States Patent
Faggin et al.

(10) Patent No.: US 11,429,153 B2
(45) Date of Patent: Aug. 30, 2022

(54) POSITIVE DISCONNECTION OF INTEGRATED INPUT DEVICES (71) Applicant: HEWLETT-PACKARD DEVELOPMENT COMPANY, L.P., Houston, TX (US)

(72) Inventors: Eric Faggin, Palo Alto, CA (US); Mary G. Baker, Palo Alto, CA (US); Helen A. Holder, Palo Alto, CA (US); Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1020 days.

(21) Appl. No.: 16/076,126

(22) PCT Filed: Apr. 25, 2017

(86) PCT No.: PCT/US2017/029254
§ 371 (c)(1),
(2) Date: Aug. 7, 2018

(87) PCT Pub. No.: WO2018/199914
PCT Pub. Date: Nov. 1, 2018

(65) Prior Publication Data
US 2021/0200281 A1 Jul. 1, 2021

(51) Int. Cl.
G06F 3/16 (2006.01)
G06F 1/16 (2006.01)
G06F 13/20 (2006.01)
H04N 5/225 (2006.01)

(52) U.S. Cl.
CPC .............. *G06F 1/1686* (2013.01); *G06F 3/16* (2013.01); *G06F 13/20* (2013.01); *H04N 5/2257* (2013.01)

(58) Field of Classification Search
None
See application file for complete search history.

(56) References Cited

U.S. PATENT DOCUMENTS

2002/0181722 A1* 12/2002 Hibino ..................... H04R 5/02
381/92
2005/0276009 A1 12/2005 Kim
2006/0250741 A1 11/2006 Camiel
(Continued)

FOREIGN PATENT DOCUMENTS

CN 104486478 4/2015
EP 3593221 A1 1/2020
(Continued)

OTHER PUBLICATIONS

Fitzpatrick, "How to Disable Your Webcam (and Why You Should)", Retrieve from internet—https://www.howtogeek.com/210921/how-to-disable-your-webcam-and-why-you-should/, 2016, 10 Pages.

*Primary Examiner* — Scott C Sun
(74) *Attorney, Agent, or Firm* — HPI Patent Department (57) ABSTRACT A computer device including an integrated input device is provided. The integrated input device includes a positive disconnect system including a display of an open connection to the integrated input device when the integrated input device is deactivated. The open connection comprises a visible metal trace on a line coupling the integrated input device to the computer device.

18 Claims, 8 Drawing Sheets (56) References Cited

U.S. PATENT DOCUMENTS

| | | | |
|---|---|---|---|
| 2011/0242391 A1 | 10/2011 | Senatori | |
| 2011/0290630 A1 | 12/2011 | Wittenberg | |
| 2013/0106704 A1 | 5/2013 | Vidal et al. | |
| 2013/0222609 A1 | 8/2013 | Soffer | |
| 2013/0295782 A1* | 11/2013 | Goel | H01R 13/6205 439/40 |
| 2014/0016031 A1 | 1/2014 | Tsai et al. | |
| 2014/0104792 A1* | 4/2014 | Jeziorek | H05K 3/0061 361/749 |
| 2016/0082896 A1* | 3/2016 | Mouser | H04N 7/183 348/148 |

FOREIGN PATENT DOCUMENTS

| | | |
|---|---|---|
| JP | H10-126063 | 5/1998 |
| JP | H11-018184 | 1/1999 |
| JP | 2000-184342 | 6/2000 |
| KR | 20080013267 | 2/2008 |
| KR | 101382270 | 4/2014 |
| WO | WO-2015157208 | 10/2015 |
| WO | 2018/199906 A1 | 11/2018 |

\* cited by examiner

FIG. 8

POSITIVE DISCONNECTION OF INTEGRATED INPUT DEVICES

BACKGROUND

Cameras on smartphones and laptops can be on and recording without the user knowing, and microphones can be active and listening without a user knowing. Many applications may show when the microphone and camera are active, but displays of the states of the camera and microphone may be bypassed. Further, in the case the microphone, many systems do not have a status LED to display if the microphone is listening or not, so there is no way for the user to know if they are being recorded. Although system-level applications may exist that may purport to disable the microphone, camera, or both, malware programs may be used to bypass these applications and place the camera or microphone back in service.

DESCRIPTION OF THE DRAWINGS

Certain examples are described in the following detailed description and in reference to the drawings, in which.

DETAILED DESCRIPTION

Examples described herein provide computing devices, herein also termed computer devices, that have integrated input devices or integrated sensors, such as microphones and cameras, in which the integrated input devices may remain in the system and yet be detachable. The computing devices may include personal computers, laptop computers, tablet computers, all-in-one computers, or smart phones, among others.

As used herein, detachable indicates that although the integrated input devices are still physically attached to the system, they are no longer electrically connected after a user takes an action to disconnect the sensor. This may include breaking connections in data lines, power lines, or both, for example, by moving the integrated input device to a different position.

Further, the connection state is visible to the user so that they may confirm that the integrated input devices, such as the camera and microphone, are no longer coupled to the system when they are in the detached state. In the systems described herein, when an integrated input device is moved to a detached position, metal traces forming the disconnected lines are visible to the user. This provides a positive feedback that the sensor has been disabled.

Figure 1A:
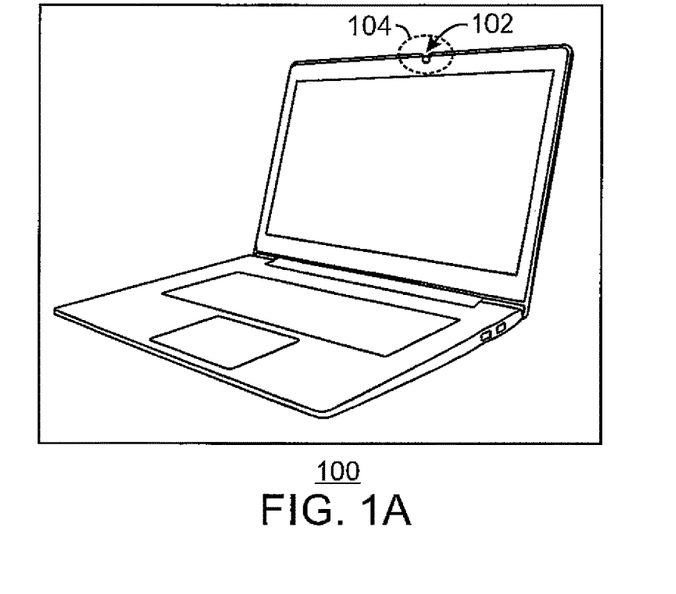
FIGS. 1A to 1C are drawings of an exemplary computing device with a camera shown in close-up views in an on position and an off position.
Figure 1B:
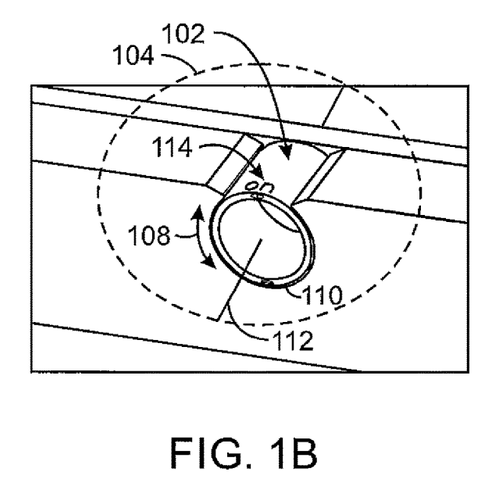
Figure 1C:
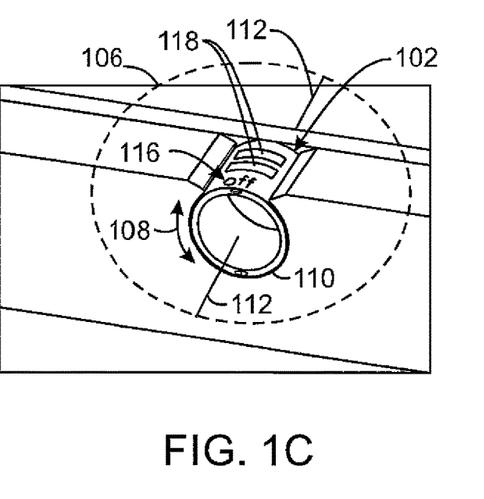

FIGS. 1A to 1C are drawings of an exemplary computing device 100 with a camera 102 shown in close-up views in an on position 104 (FIG. 1B) and off position 106 (FIG. 1C). The camera 102 may be moved between the on position 104 to the off position 106 by rotation 108 of the camera housing 110 around an axis 112. An indicia may be included to confirm that the camera 102 is in one position or the other, for example, an on label 114 when the camera 102 is in the on position 104 and an off label 116 when the camera 102 is in the off position 106.

Positive confirmation of the detached status of the camera 102 in the off position 106 may be determined by a user by the visibility of metal traces 118. The metal traces 118 are conductors on the lines that connect the camera 102 to the system of the computing device 100. The number of metal traces 118 that may be visible is not limited to two, but may be any number depending on the number of data or power lines that are being disconnected. In some examples, only the signal line from the camera 102 is disconnected, while power lines are left intact.

If the connection to the camera 102 is a serial interface protocol (SIP) bus the two metal traces 118 may be both lines of the SIP bus, which disconnect both signal and power connections to the camera 102. In other examples, a single signal line, indicated by a single metal trace 118, may be disconnected.

Figure 3:
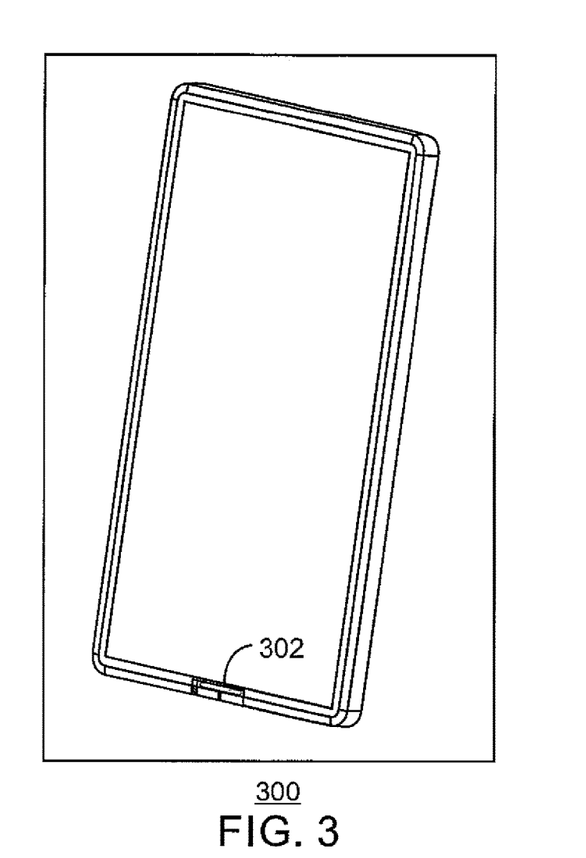
FIGS. 3A to 3C are drawings of an exemplary smart phone with the microphone element shown in close-up views in an on position and an off position.

The connection to the metal traces 118 may be performed by spring terminals that complete the connection as the metal traces 118 are rotated under them. In other examples, other types of connections may be used depending on the motion used to detached the sensor. This is discussed further with respect to FIGS. 3A to 3C.

Figure 2A:
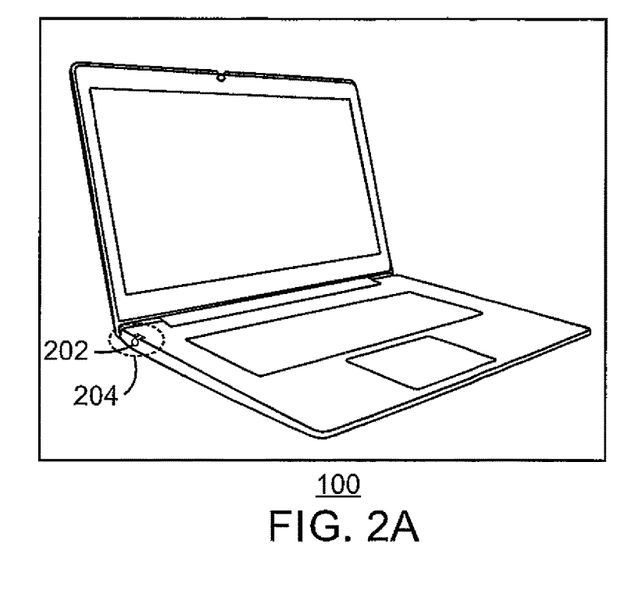
FIGS. 2A to 2C are drawings of the exemplary computing device with a microphone shown in close-up views in an on position and an off position.
Figure 2B:
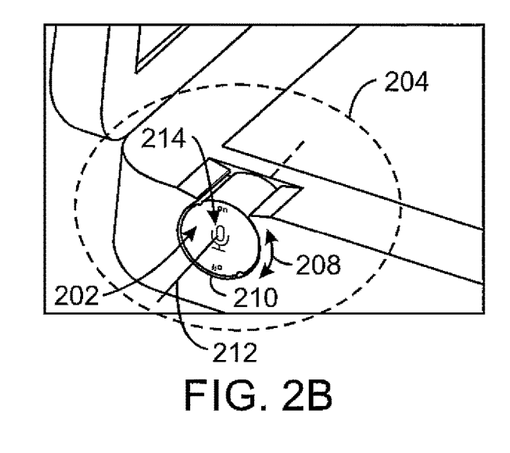
Figure 2C:
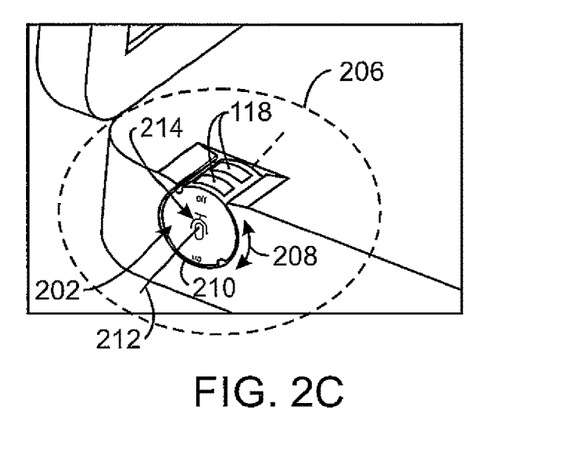

FIGS. 2A to 2C are drawings of the exemplary computing device 100 with a microphone 202 shown in close-up views in an on position 204 (FIG. 2B) and off position 206 (FIG. 2C). Like numbered items are as described with respect to FIG. 1. As for the camera 102 described with respect to FIG. 1, the microphone 202 may be moved between the on position 204 to the off position 206 by rotation 208 of the microphone housing 210 around an axis 212. Indicia 214 may be printed on the microphone housing 210 to indicate when the microphone 202 is in the on position 204 or the off position 206.

As for the camera 102, positive confirmation of the detached status of the microphone 202 in the off position 206 may be provided to the user by the visibility of one or more metal traces 118. In this example, the metal traces 118 are conductors on the lines that connect the microphone 202 to the system of the computing device 100.

The disconnected metal traces 118 for the microphone 202 and the camera 102 may be protected from damage or corrosion by a transparent surface. For example, a glass or plastic cover may be placed over the portion of the microphone 202 or the camera 102 that includes the metal traces 118. This may also protect the metal traces 118 from contamination, for example, from oils in a fingertip that may lead to poor connections when the microphone 202 or the camera 102 is placed back in service.

Figure 3B:
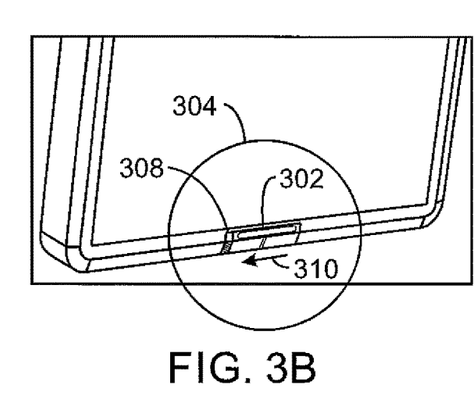
Figure 3C:
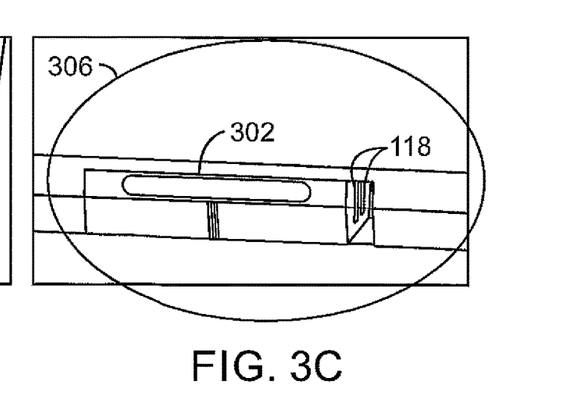

FIGS. 3A to 3C are drawings of an exemplary smart phone 300 with a microphone element 302 shown in close-up views in an on position 304 (FIG. 3B) and off position 306 (FIG. 3C). Like numbered items are as described with respect to FIG. 1. In the on position 304, an indicator 308, such as a green line, may be included to confirm the location. The microphone element 302 may be disabled by a sliding motion 310, which may both hide the indicator 308 and expose the metal traces 118 that couple the microphone element 302 to the circuits of the system, affirmatively confirming the detachment of the microphone element 302. As described herein, the metal traces 118 may be protected by a transparent cover connected to the slider switch, for example, the transparent cover may slide out of the case of the smart phone 300 as the microphone element 302 is disengaged.

In the example shown in FIGS. 3A to 3C, the metal traces 118 may be disconnected in a vertical motion from terminals on the opposite side of the opening. Accordingly, connections to the metal traces 118 may be made by spring-loaded terminals, such as PONG terminals.

Figure 4A:
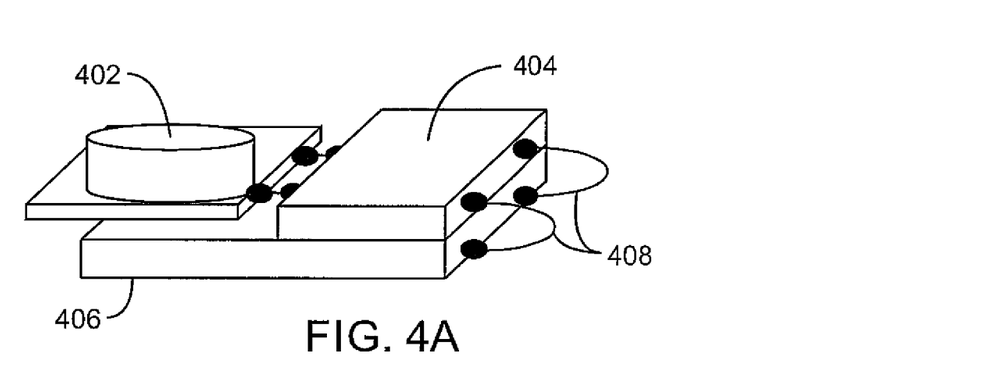
FIGS. 4A and 4B are drawings of an example of a disconnection of a microphone from a system-on-a-chip motherboard by moving the microphone to a new position.
Figure 4B:
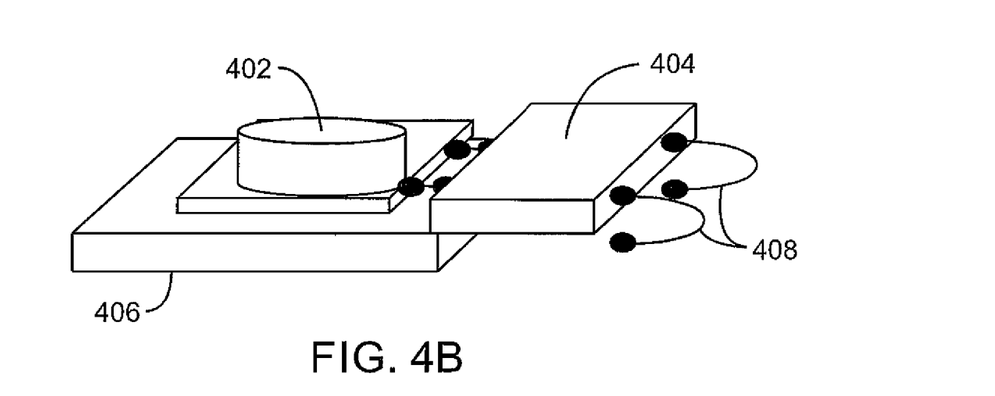

FIGS. 4A and 4B are drawings of an example of a disconnection of a microphone 402 from a system-on-a-chip motherboard by moving the microphone 402 to a new position. In this example, the microphone 402 remains coupled to an analog-to-digital converter (ADC) 404, while the connections are broken between the ADC 404 and an SoC 406. The metal traces 118, described with respect to FIGS. 1A to 3C, may form part of the lines 408 coupling the ADC 404 to the SoC 406. As the lines 408 are after the ADC 404, for example, on a low-speed digital bus, they may be less prone to problems with noise, for example, which may be caused as a result of poor connections from multiple connection and disconnection cycles.

Figure 5A:
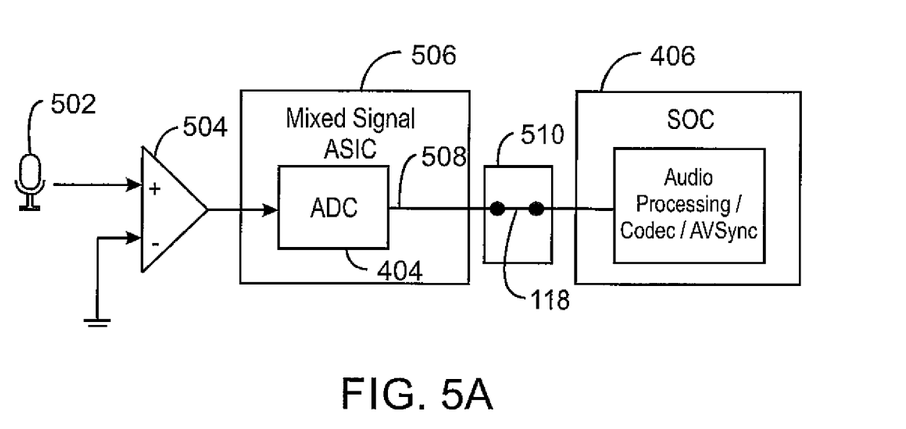
FIGS. 5A and 5B are drawings of an example of a disconnection of a microphone from a system-on-a-chip motherboard by moving a signal line to an open position.
Figure 5B:
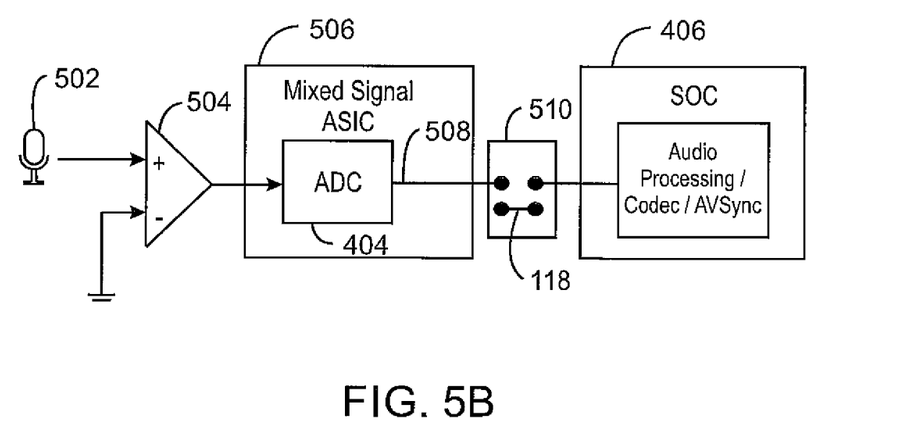

FIGS. 5A and 5B are drawings of an example of a disconnection of a microphone from a system-on-a-chip motherboard by moving a signal line to an open position. Like numbered items are as described with respect to FIGS. 1, 4A, and 4C.

As described with respect to FIGS. 4A and 4B, the analog circuitry may be more prone to noise than the digital circuitry, and thus the disconnection may be placed on the digital signal lines.

As shown in FIGS. 5A and 5B, a microphone 502 may provide an input to an operational amplifier (op amp) 504. The output of the op amp 504 may be provided to a mixed-signal, application specific integrated circuit (ASIC) 506, which includes the ADC 404. The ASIC 506 may generate a pulse code modulated (PCM) signal 508, which may be provided to the SoC 406 through a connection block 510 that includes the metal trace 118. As used herein, the connection block 510 may be the rotating housing of a camera, the rotating housing of a microphone, or the sliding housing of a microphone and a smart phone, among others.

Moving the connection block 510, for example, through a rotational or sliding motion, from the position shown in FIG. 5A to the position shown in FIG. 5B, moves the metal trace 118 away from the lines between the mixed-signal ASIC 506 and the SoC 406, detaching the microphone from the system. Further, when the connection block 510 is moved, the metal trace 118 becomes visible to the user.

Figure 6:
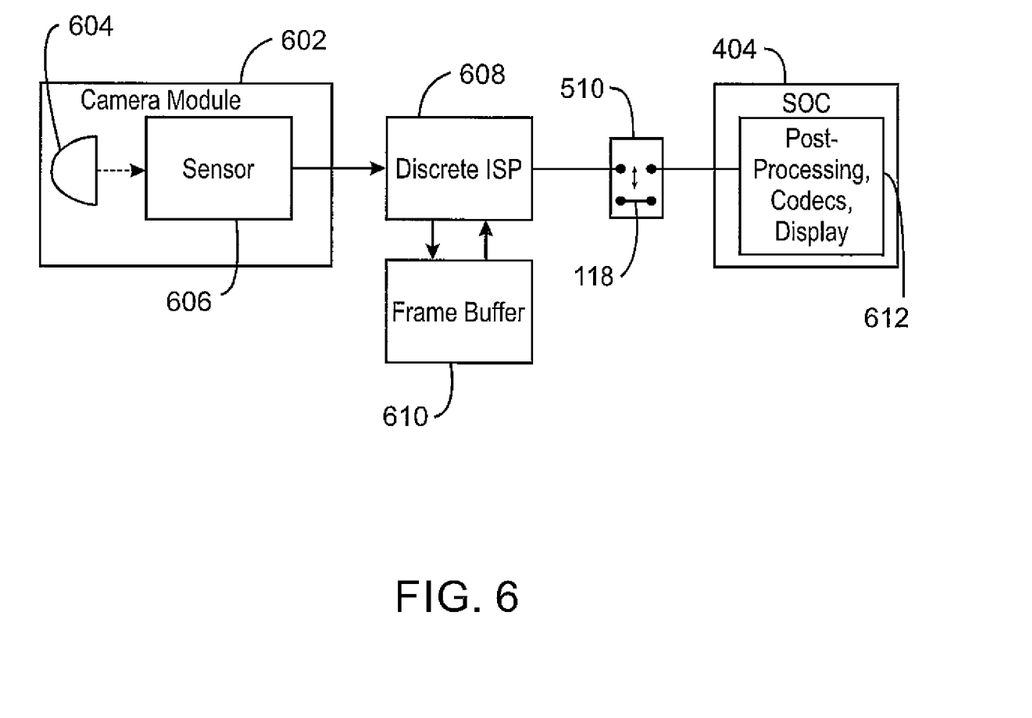
FIG. 6 is a drawing of an example of a disconnection of a camera module 602 from an SoC 404 by moving a connection block to an open position.

FIG. 6 is a drawing of an example of a disconnection of a camera module 602 from an SoC 404 by moving a connection block 510 to an open position. Like numbered items are as described with respect to FIGS. 1 and 4. In this example, the camera module 602 includes a lens 604 and a sensor 606. The sensor 606 may be a CMOS sensor or a CCD sensor, which may include electronics to provide a serial data bus, for example, in accordance with the specifications provided by the Mobile Industry Processor Interface (MIPI) alliance, to a discrete integrated signal processor (ISP) 608. The ISP 608 may be coupled to a frame buffer 610 to store individual frames. The connections between the sensor 606, the ISP 608, and the frame buffer 610 are real-time high speed bus connections carrying image data to generate frames that are stored in the frame buffer 610.

Buffering incoming lines or frames from camera sensors in the frame buffer 610 may reduce the real-time requirements for data transfer. As a result, the output from the ISP 608 may then be passed to the SoC 404 over a lower speed MIPI bus for post processing, for example, to reduce noise and improve quality, to encode images using coder-decoder (codec), and to display it on a display attached to the device, as shown in block 612. Accordingly, placing the connection block 510 between the ISP 608 and the SoC 404 and buffering frames to relax the real-time requirements may improve the reliability of the system.

Figure 7:
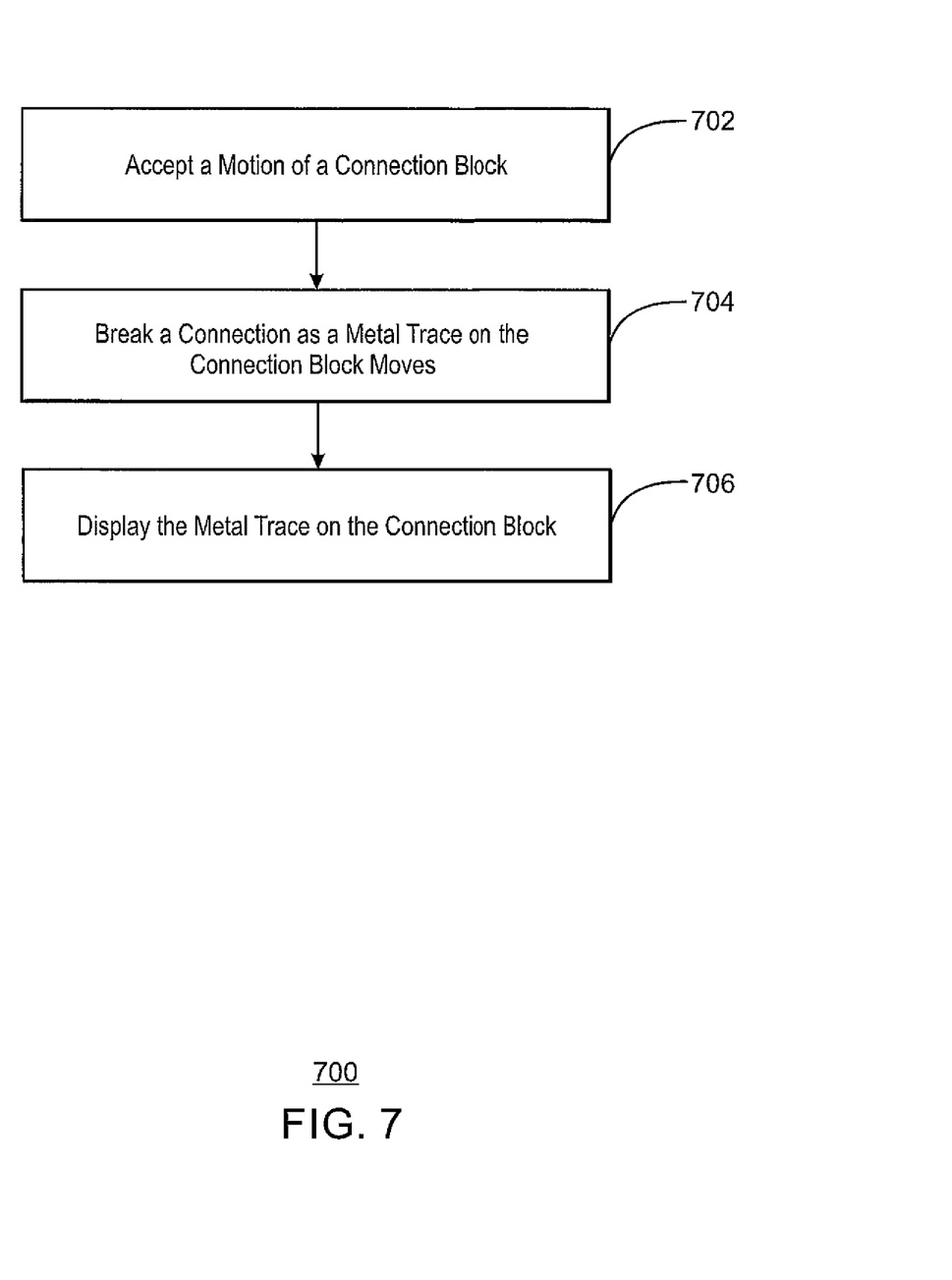
FIG. 7 is a process flow diagram of an example of a method for confirming the disconnection of a sensor by a device.

FIG. 7 is a process flow diagram of an example of a method 700 for confirming the disconnection of a sensor by a device. The method begins at block 702 when the device accepts a motion of a connection block, for example, from a first position to a second position. The movement from the first position to the second position may include rotation of the connection block, or sliding of the connection block, among others.

At block 704, in response to the movement, the device breaks the connection between the sensor and the system circuitry, for example, by moving a metal trace away from connections that couple a data line, a power line, or both to the system circuitry. In a first position, the sensor is connected to the system circuitry and is active. In the second position, the sensor is detached from the system circuitry and is disabled.

At block 706, the device may display the metal trace on the connection block in the second position. This may allow a user to confirm the sensor is detached. As described herein, the connection block may be the housing of the sensor, such as a camera or microphone, and the metal trace may be a conductor used by a data or power line.

Figure 8:
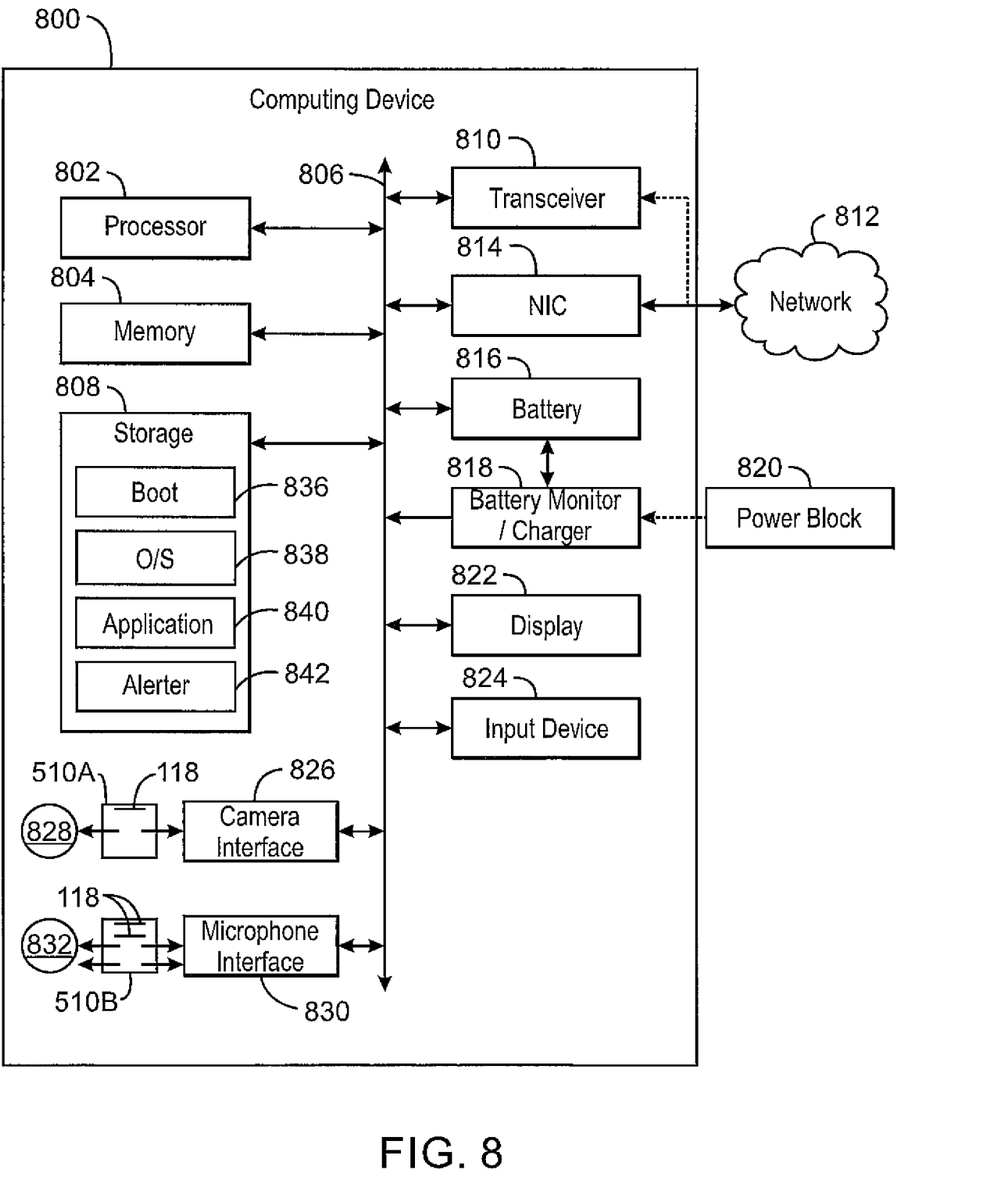
FIG. 8 is a block diagram of an example of components that may be present in a computing system that has a visible confirmation of the disconnection of a sensor system.

FIG. 8 is a block diagram of an example of components that may be present in a computing system that has a visible confirmation of the disconnection of a sensor system. The computing device 800 may be a laptop computer, a tablet computer, a smart phone, or any number of other devices. The computing device 800 may include a processor 802, which may be a microprocessor, a single core processor, a multi-core processor, a multithreaded processor, an ultra-low voltage processor, an embedded processor, or any other type of processors. The processor 802 may be a part of a system-on-a-chip in which the processor 802 and other components are formed into a single integrated circuit or on a single circuit board.

The processor 802 may communicate with a system memory 804 over a bus 806. Any number of memory devices may be used to provide for a given amount of system memory, including random access memory (RAM), static random access memory (SRAM), dynamic RAM, and the like.

A mass storage 808 may also be coupled to the processor 802 via the bus 806. The mass storage 808 may be included to provide for persistent storage of information and data. The mass storage 808 may be implemented via a solid-state drive (SSD). Other devices that may be used for the mass storage 808 include read only memory (ROM), flash memory, micro hard drives, hard drives, and the like.

The components may communicate over the bus 806. The bus 806 may include any number of technologies, including industry standard architecture (ISA), extended ISA (EISA), peripheral component interconnect (PCI), peripheral component interconnect extended (PCIx), PCI express (PCIe), or any number of other technologies. The bus 806 may be a proprietary bus, for example, used in a SoC based system, such as in a smart phone, tablet computer, and the like. Other bus systems may be included, such as point-to-point interfaces and a power bus, among others.

The bus 806 may couple the processor 802 to a transceiver 810, for communications with a cloud 812, such as a local network, a wide area network or the Internet. The transceiver 810 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group. The transceiver 810 may include a WLAN unit that may be used to implement Wi-Fi™ communications in accordance with the Institute of Electrical and Electronics Engineers (IEEE) 802.11 standard. In addition, wireless wide area communications, for example, according to a cellular or other wireless wide area protocol, can occur via a WWAN unit.

A network interface controller (NIC) 814 may be included to provide a wired communication link to a network 812. The wired communication link may provide an Ethernet protocol connection, or may provide a wired communication link that is based on other types of network and interface protocols.

A battery 816 may power the computing device 800, although the computing device 800 may use a power supply that is directly coupled to an electric power grid. The battery 816 may be a lithium ion battery, a metal-air battery, or nickel cadmium battery, among others. A battery monitor/charger 818 may be included in the computing device 800 to charge the battery 816, monitor the charging of the battery 816, and monitor the status of the charge on the battery 816.

A power block 820 may be coupled with the battery monitor/charger 818 to charge the battery 816. In some examples, the power block 820 may be replaced with a wireless power receiver to provide the power wirelessly, for example, through a loop antenna in the computing device 800.

The bus 806 may couple the processor 802 to a display device 822. The display device 822 may be built into the computing device 800, such as an integrated display in a laptop computer, a tablet computer, or a smart phone. In other examples, the display device 822 may be an external device coupled to the computing device 800 through an interface.

An input device 824 may be coupled to the processor 802 through the bus 806. The input device 824 may be a touchscreen panel associated with the display device 822, a keyboard built into the computing device 800, a touchpad built into the computing device 800, an external pointing device, such as a keyboard or a mouse connected to the computing device 800, or any combinations thereof.

A camera interface 826 may be coupled to the processor 802 through the bus 806. The camera interface 826 may couple to a camera 828 through a connection block 510A, as described herein. The connection block 510A may include a metal trace 118 that can be disconnected from a line coupling the camera 828 to the camera interface 826. When the metal trace 118 is disconnected, it will be visible to a user of the computing device 800 to confirm that the camera 828 has been deactivated. As described herein, the connection block 510A may be the body of the camera 828, which may be rotated or otherwise moved to an attached or detached position.

A microphone interface 830 may be coupled to the processor 802 through the bus 806. The microphone interface 830 may couple to a microphone 832 through a second connection block 510B. As for the connection block 510A coupling the camera 828 to the camera interface 826, the connection block 510B may include a metal trace 118 that can be disconnected from a line coupling the microphone 832 to the microphone interface 830.

Although the first connection block 510A is shown with a single metal trace 118, and the second connection block 510B is shown with two metal traces 118, any number of metal traces 118 may be present on either connection block 510A or 510B. For example, a single metal trace 118 may be used to decouple a low speed digital signal on a data line, while two metal traces 118 may be used to decouple both lines of an SIP bus.

The mass storage 808 may include code modules to implement functionality. A booting module 826 may include start up code to boot the processor 802. An operating system 828 may be included to provide an interface between the user and the computing device 800, and to provide basic operations within the computing device 800. Applications 830 may be included to provide functionality, such as communication applications, word processing applications, and the like.

An alerter 842 may be used to provide additional confirmation of the status of the sensors, for example, showing an indicator at the bottom of the screen to indicate the status. In in some examples, the alerter 842 may temporarily display a pop up box when the status of the sensor is changed, indicating that the sensor is activated or detached.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A computer device, comprising:
   an integrated input device physically attached to the computing device, wherein the integrated input device comprises:
   an activation position to electrically couple the integrated input device to the computer device;
   a deactivation position to electrically decouple the integrated input device from the computer device;
   a housing; and
   a metal trace, located on the housing, wherein:
   while the integrated input device is in the activation position, the metal trace is concealed from view and electrically connects the integrated input device to the computer device;
   while the integrated input device is in the deactivation position, the metal trace is visible and the integrated input device is electrically disconnected, at the metal trace, from the computer device; and
   while the integrated input device transitions from the activation position to the deactivation position a transparent cover extends from a case of the computing device over the metal trace to protect the metal trace.

2. The computer device of claim 1, wherein the integrated input device comprises a camera.

3. The computer device of claim 1, wherein the integrated input device comprises a microphone.

4. The computer device of claim 1, wherein the integrated input device is moved to the deactivation position by rotating the housing of the integrated input device until the metal trace is visible.

5. The computer device of claim 1, wherein the integrated input device is moved to the deactivation position by sliding the housing of the integrated input device from a first position to a second position.

6. The computer device of claim 1, wherein while the integrated input device is in the activation position, the metal trace couples a data connection to the computer device.

7. The computer device of claim 1, wherein while the integrated input device is in the activation position, the metal trace couples a power connection to the integrated input device.

8. The computer device of claim 1, wherein while the integrated input device is in the activation position the metal trace couples the integrated input device from a signal processor to an input line on a system on a chip (SOC).

9. The computer device of claim 1, comprising a device alerter to alert a user that the integrated input device is in the deactivation position.

10. An integrated input device, comprising:
    a body comprising a connection block; and
    a metal trace positioned on an outer surface of the connection block, wherein:
        while the connection block is in a first position, the metal trace is concealed from view and electrically couples the integrated input device to a computing device physically attached to the integrated input device;
        while the connection block is in a second position, the metal trace of the integrated input device is visible and is electrically decoupled from the computing device physically attached to the integrated input device; and
        while the connection block transitions from the first position to the second position a transparent cover extends from a case of the computing device over the metal trace to protect the metal trace.

11. The integrated input device of claim 10, wherein while the metal trace is in the first position and is concealed the integrated input device is activated and while the metal trace is in the second position and is visible the integrated input device is deactivated.

12. A method for electrically disconnecting an integrated input device physically attached to a computer device from the computer device, comprising:
    receiving a motion of the integrated input device to break an electrical connection to the integrated input device, deactivating the integrated input device;
    displaying a metal trace comprising the electrical connection to the integrated input device to indicate the electrical connection to the integrated input device has been broke; and
    extending, from a case of the computer device, a transparent cover over the displayed metal trace to protect the metal trace.

13. The method of claim 12, wherein the motion of the integrated input device comprises a rotation of the integrated input device, wherein the metal trace is on a surface of the integrated input device.

14. The method of claim 12, wherein the motion of the integrated input device comprises a sliding of the integrated input device to a new position to display the metal trace.

15. The method of claim 12, comprising electrically re-coupling the integrated input device to the computer device by accepting a reverse motion of the integrated input device and electrically reconnecting the integrated input device using the metal trace.

16. The computer device of claim 1, wherein the integrated input device includes a first indicia to confirm the integrated input device is in the activation position and a second indicia to confirm the integrated input device is in the deactivation position.

17. The integrated input device of claim 10, wherein while the connection block is in a first position, the metal trace electrically couples the integrated input device to a spring-loaded terminal of the computing device.

18. The integrated input device of claim 15, wherein while accepting the reverse motion of the integrated input device the transparent cover retracts from covering the metal trace.

\* \* \* \* \*